(12) United States Patent
Romeo

(10) Patent No.: US 9,985,528 B2
(45) Date of Patent: May 29, 2018

(54) POWER CONVERTER WITH HYSTERETIC BUCK-BOOST ARCHITECTURE AND METHOD THEREFOR

(71) Applicant: SEMICONDUCTOR COMPONENTS INDUSTRIES, LLC, Phoenix, AZ (US)

(72) Inventor: Dominique Romeo, Montauban (FR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 82 days.

(21) Appl. No.: 15/019,288

(22) Filed: Feb. 9, 2016

(65) Prior Publication Data

US 2016/0294277 A1    Oct. 6, 2016

Related U.S. Application Data

(60) Provisional application No. 62/142,670, filed on Apr. 3, 2015.

(51) Int. Cl.
*H02M 3/158* (2006.01)
*H02M 1/00* (2006.01)

(52) U.S. Cl.
CPC .. *H02M 3/1582* (2013.01); *H02M 2001/0009* (2013.01)

(58) Field of Classification Search
CPC .............. H02M 3/156; H02M 3/1582; H02M 2001/0009
See application file for complete search history.

(56) References Cited

U.S. PATENT DOCUMENTS

| 6,166,527 | A | 12/2000 | Dwelley et al. | |
| 6,879,136 | B1 * | 4/2005 | Erisman | H02M 3/156 323/224 |
| 7,508,182 | B1 * | 3/2009 | Chang | H02M 3/1588 323/282 |
| 7,768,245 | B1 * | 8/2010 | De Cremoux | H02M 3/156 323/225 |
| 7,936,160 | B1 * | 5/2011 | Sheehan | H02M 3/156 323/222 |
| 9,748,843 | B2 * | 8/2017 | Zhang | H02M 3/1582 |
| 2015/0069958 | A1 * | 3/2015 | Yang | H02J 7/0052 320/107 |
| 2015/0381037 | A1 * | 12/2015 | Romeo | H02M 3/156 323/282 |

* cited by examiner

*Primary Examiner* — Jue Zhang
*Assistant Examiner* — Jye-June Lee
(74) *Attorney, Agent, or Firm* — Polansky & Associates, P.L.L.C.; Paul J. Polansky

(57) ABSTRACT

In one form, an apparatus comprises a buck-boost converter circuit, a ripple emulator circuit, a ripple based controller circuit, and a switch control circuit. The buck-boost converter circuit includes a plurality of switches to be coupled to an inductor, and is configured to generate a regulated output voltage responsive to an input voltage. The ripple emulator circuit is configured to emulate inductor current ripple for a buck phase and a boost phase of the buck-boost converter to provide an emulated inductor current ripple. The ripple based controller circuit is configured to generate a hysteretic control signal responsive to the emulated inductor current ripple and the output voltage. The switch control circuit is configured to generate control signals for driving the plurality of switches responsive to the hysteretic control signal and a clock signal.

20 Claims, 4 Drawing Sheets

POWER CONVERTER WITH HYSTERETIC BUCK-BOOST ARCHITECTURE AND METHOD THEREFOR

This application claims priority to provisional application No. 62/142,670, filed Apr. 3, 2015, entitled "Power Converter with Dual Ripple Emulator and Ripple Based Hysteretic Controller," invented by Dominique Romeo, the contents of which are incorporated herein by reference.

FIELD OF THE DISCLOSURE

The present disclosure relates generally to power conversion circuits, and more particularly to direct current (DC)-to-DC buck-boost converters.

BACKGROUND

DC-to-DC converters are power converters that convert one direct current (DC) voltage into another DC voltage. If the converter converts an input voltage from a higher voltage to a lower output voltage, it is known as a buck converter. A typical buck converter connects the first terminal of the inductor to an input voltage and uses a pair of switches that alternatively connect the second terminal of the inductor to an output terminal or to ground to regulate the output voltage at the second terminal of the inductor to the desired level. If the converter converts an input voltage from a lower voltage to a higher output voltage, it is known as a boost converter. A typical boost converter uses a pair of switches that alternatively connect a first terminal of an inductor to an input voltage or to ground to regulate the output voltage at the second terminal of the inductor to a desired level. If the converter converts a variable input voltage that may be slightly higher or slightly lower than the desired output voltage, it is known as a buck-boost converter because it is capable of alternatively operating in the buck more, in boost mode, or in the buck-boost mode based on the relationship between the input voltage and the desired output voltage. Buck-boost converters typically use four switches connected to an inductor that are alternatively conductive to control the mode of operation. Buck-boost converters have become increasingly popular in recent years due to the large number of consumer products that operate using batteries whose voltage varies over a wide range.

DC-DC power converters typically operate using pulse width modulation (PWM) based on a reference clock signal. In general PWM converters have poor efficiency during light load conditions that are common in battery-powered products. In order to overcome these limitations, PWM converters often add a second control loop to improve efficiency during light load conditions in which the second loop uses skip mode, pulse frequency modulation, frequency foldback, or hysteretic conversion. However dual loop systems suffer from poor load transients when switching between normal and light loads.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

For simplicity and clarity of the illustration, elements in the figures are not necessarily to scale, are only schematic, and are non-limiting. Additionally, descriptions and details of well-known steps and elements are omitted for simplicity of the description. It will be appreciated by those skilled in the art that the words "during", "while", and "when" as used herein relating to circuit operation are not exact terms that mean an action takes place instantly upon an initiating action but that there may be some small but reasonable delay, such as a propagation delay, between the reaction that is initiated by the initial action. Additionally, the term "while" means that a certain action occurs at least within some portion of a duration of the initiating action. The use of the word "approximately" or "substantially" means that a value of an element has a parameter that is expected to be close to a stated value or position. However, as is well known in the art there may be minor variances that may prevent the values or positions from being exactly as stated.

Figure 1:
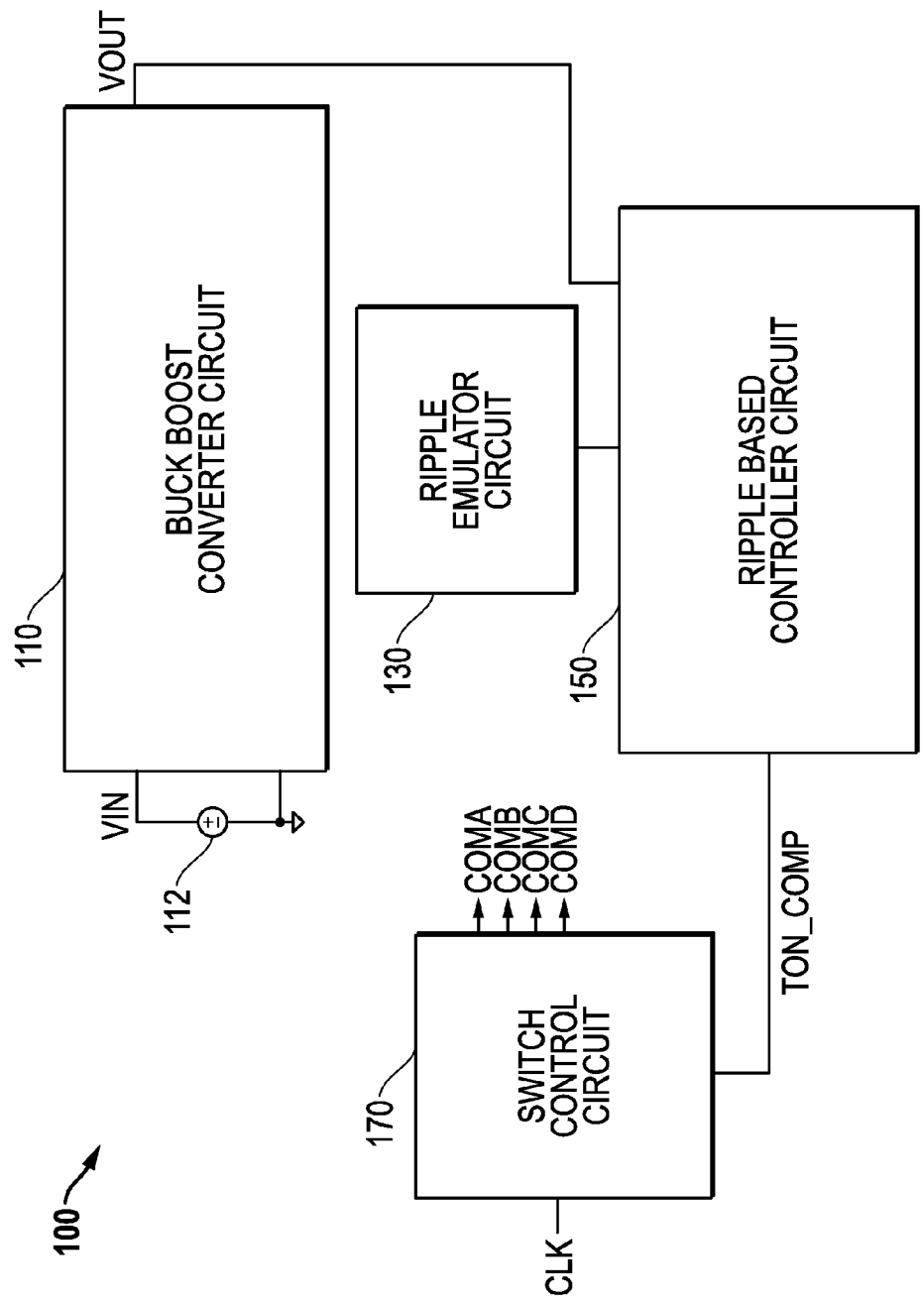
FIG. 1 illustrates in block diagram form one example of an apparatus that may be used for DC-DC power conversion.

FIG. 1 illustrates in block diagram form one example of an apparatus 100 that may be used for DC-DC power conversion. The apparatus 100 in FIG. 1 includes a buck-boost converter circuit 110, a ripple emulator circuit 130, a ripple based controller circuit 150, and a switch control circuit 170. The buck-boost converter circuit 110 may include a plurality of switches and an inductor (or other energy storage element), and may be configured to generate a regulated output voltage VOUT responsive to an input voltage VIN generated by a voltage source 112. The voltage source 112 may supply a source voltage that is lower or higher than the regulated output voltage VOUT—for example, the voltage source 112 may be or include a battery with a relatively high voltage when it is fully charged and a relatively low voltage when it is nearing the end of its charge.

The buck-boost converter circuit 110 may operate in a buck mode (in which the output voltage VOUT is regulated to be lower than the input voltage VIN), a boost mode (in which the output voltage VOUT is regulated to be higher than the input voltage VIN), or in buck-boost mode (in which the output voltage VOUT is higher, lower, or the same as the input voltage). In buck-boost mode, the operation of the buck-boost converter circuit 110 may be considered to have both a buck phase and a boost phase during which current in the inductor may continuously change in order to produce the desired output voltage VOUT.

In one embodiment, and as more fully described below with reference to FIG. 3, the buck-boost converter circuit 110 may be a four switch non-inverting buck-boost converter. In other embodiments, however, the buck-boost converter circuit 110 may have a different architecture.

The ripple emulator circuit 130 may be configured to emulate inductor current ripple for buck and boost phases of the buck-boost converter circuit 110 when operating in buck-boost mode. The emulated inductor current ripple may in some embodiments be independent of one or more parasitics related to an output capacitance of the buck-boost converter circuit 110.

The ripple based controller circuit 150 may be configured to generate a hysteretic control signal TON_COMP responsive to the emulated inductor current ripple and the output voltage VOUT. The hysteretic control signal TON_COMP may be generated with a stable frequency by the ripple based controller circuit 150, and, together with a clock signal CLK (which is explained in more detail below) generated by an oscillator, may be used to generate the control signals for the buck-boost converter circuit 110. More specifically, in some embodiments, by varying the duty cycle of the hysteretic control signal TON_COMP and the phase of the hysteretic control signal TON_COMP relative to the clock signal CLK, the ripple based controller circuit 150 may be configured to maintain the output voltage VOUT near a reference (e.g., target) voltage for varying load current requirements by generating control signals for the operation of the buck-boost converter circuit 110. In this manner, even if the load current demand increases or decreases (or even if other factors change, such as temperature), the apparatus 100 can regulate the output voltage using the constant clock signal CLK and the asynchronous hysteretic control signal TON_COMP generated by the ripple based controller 150, as described herein.

The switch control circuit 170 may be configured to generate control signals COMA, COMB, COMC, COMD for driving the buck-boost converter circuit 110 (e.g., for driving various internal switches of the buck-boost converter circuit 110) responsive to the hysteretic control signal and a clock signal CLK.

The clock signal CLK may control whether the buck-boost converter circuit 110 operates in a buck phase or a boost phase of buck-boost operations—for example, the buck-boost converter circuit 110 may operate in the buck phase responsive to the clock signal CLK being high and may operate in the boost phase responsive to the clock signal CLK being low. Also, the clock signal CLK may be asynchronous to the hysteretic control signal TON_COMP (or vice versa) in some embodiments.

Figure 2:
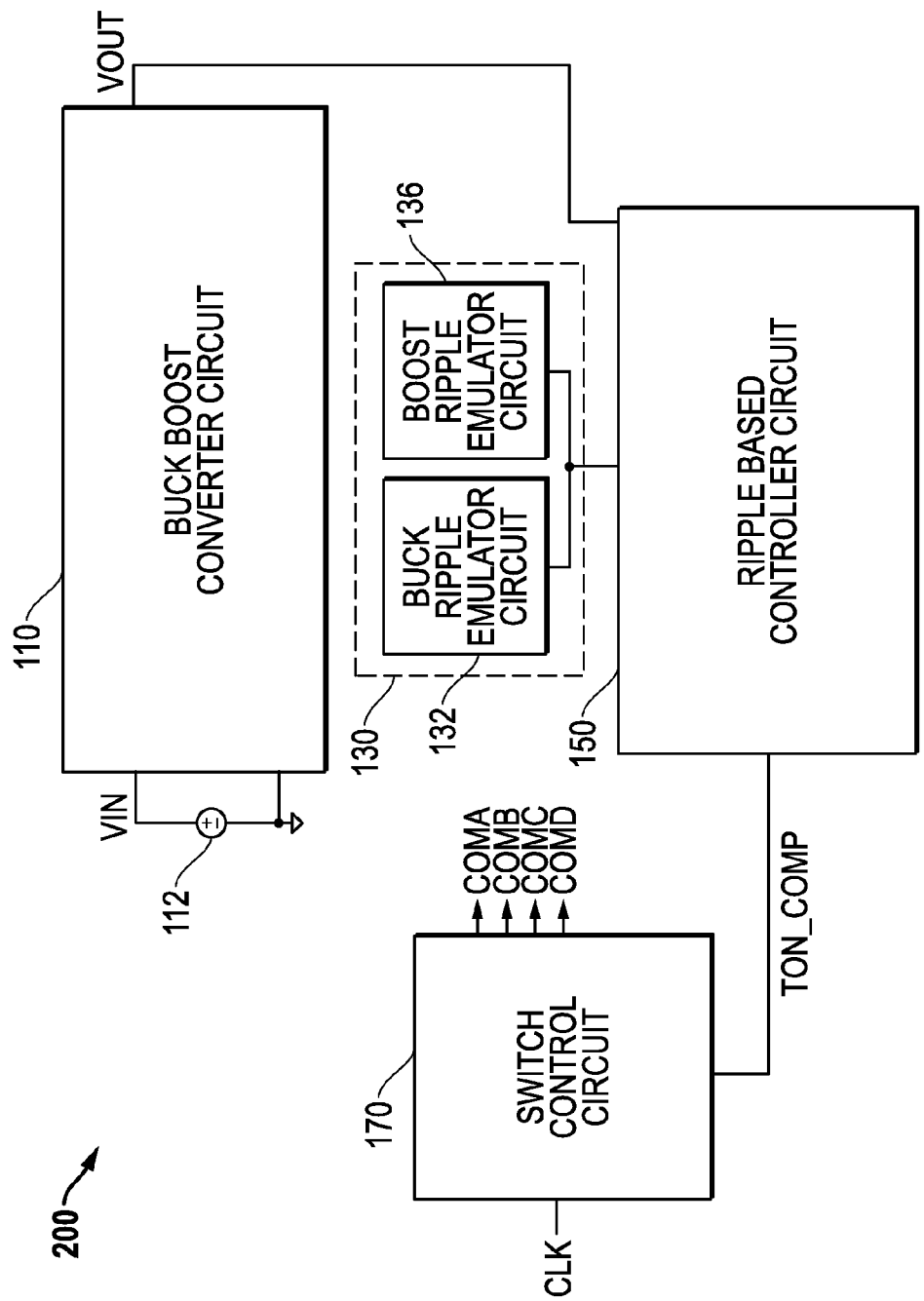
FIG. 2 illustrates in block diagram form an apparatus that may be used for DC-DC power conversion, various aspects of which may be examples of elements of the apparatus of FIG. 1.

FIG. 2 illustrates in block diagram form an apparatus 200 that may be used for DC-DC power conversion, various aspects of which may be examples of elements of the apparatus 100 in FIG. 1. In FIG. 2, the ripple emulator circuit 130 is shown including a buck ripple emulator circuit 132 and a boost ripple emulator circuit 136. The buck ripple emulator circuit 132 in FIG. 2 may be configured to emulate inductor current ripple for the buck phase of a buck-boost mode of operation, and the boost ripple emulator circuit 136 in FIG. 2 may be configured to emulate inductor current ripple for the boost phase of the buck-boost mode of operation.

Still referring to FIG. 2, the buck ripple emulator circuit 132 and the boost ripple emulator circuit 136 may be configured to simultaneously operate. In other words, they both may emulate inductor current ripple, regardless of whether the buck-boost converter circuit 110 is in the buck phase or the boost phase of a buck-boost mode of operation, and the emulated current ripple for the buck phase can be summed with the emulated inductor current ripple for the boost phase, as shown in FIG. 2. In this manner, the ripple emulator circuit 130 may, in some embodiments, smoothly transition between buck and boost phases.

FIG. 2 also shows that the sum of the emulated inductor current ripple for the buck and boost phases can be provided to the ripple based controller circuit 150, which, as described herein, combines this combined emulated inductor current ripple with the output voltage VOUT to generate the hysteretic control signal TON_COMP.

Figure 3:
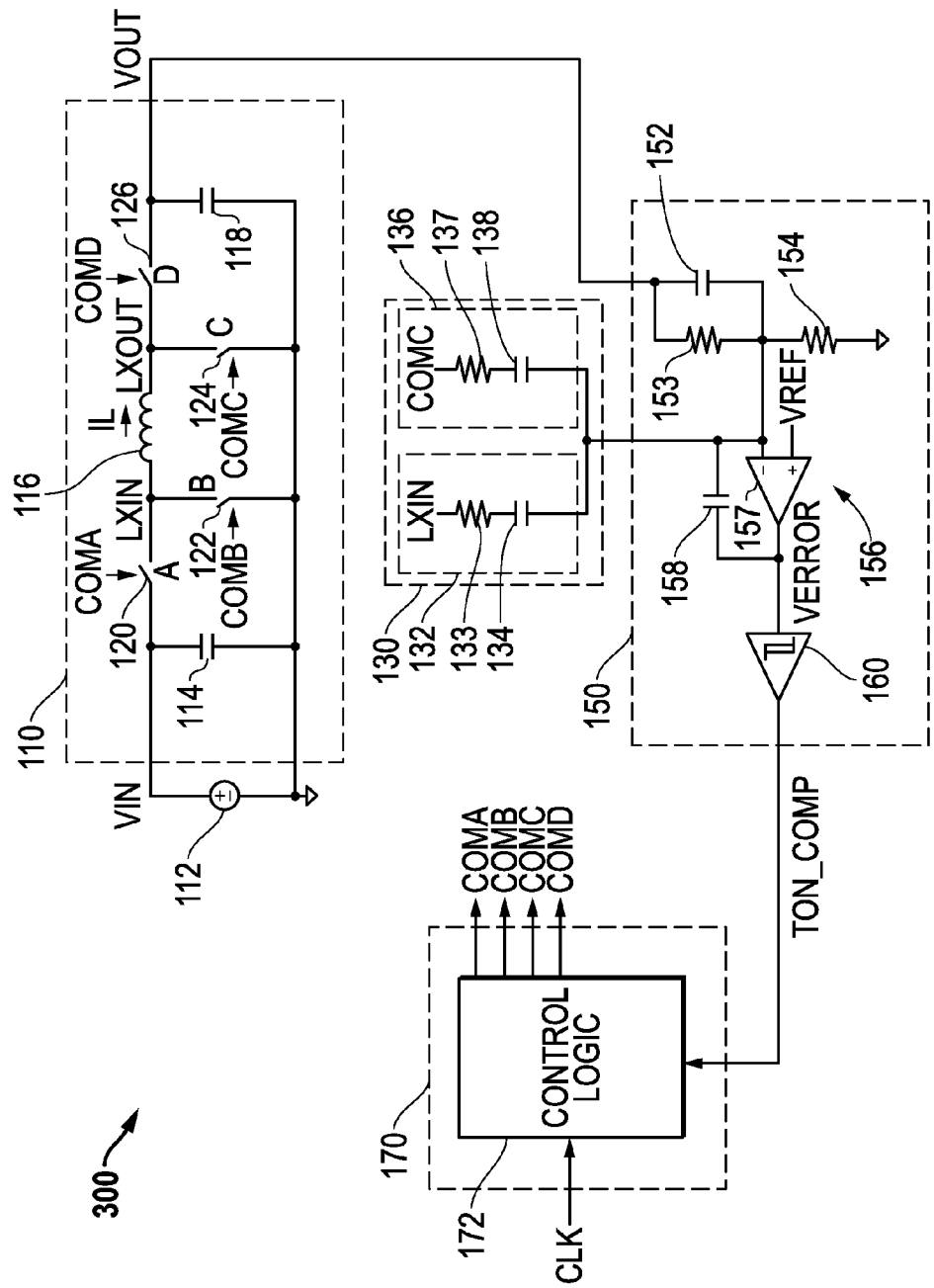
FIG. 3 illustrates in partial block diagram and partial schematic form an apparatus that may be used for DC-DC power conversion, various aspects of which may be examples of elements of the apparatuses of FIGS. 1 and 2.

FIG. 3 illustrates in partial block diagram and partial schematic form an apparatus 300 that may be used for DC-DC power conversion, various aspects of which may be examples of elements of apparatuses 100 and 200 in FIGS. 1 and 2. As illustrated in FIG. 3, the buck-boost converter circuit 110 may be a four switch non-inverting buck-boost power converter in some examples, and may include high side and low side boost and buck switches 120, 122, 124, and 126. The buck-boost converter circuit 110 in FIG. 3 also includes an inductor 116, and input and output capacitances 114 and 118, respectively, are also shown. The buck-boost converter circuit 110 in FIG. 3 operates by opening and closing the switches 120, 122, 124, 126 to regulate the output voltage VOUT.

The buck ripple emulator circuit 132 of the ripple emulator circuit 130 in FIG. 3 includes a resistance 133 and a capacitance 134 together forming an RC network. The resistance 133 is driven by a signal LXIN that represents the voltage at the input terminal of the inductor 116 of the buck-boost converter circuit 110. As described above, the buck ripple emulator circuit 132 emulates current ripple during buck phases of buck-boost operations.

The boost ripple emulator circuit 136 of the ripple emulator circuit 130 in FIG. 3 includes a resistance 137 and a capacitance 138 together forming an RC network. The resistance 137 is driven by a signal COMC that represents the control signal COMC driving the low side switch 124 in the buck-boost converter circuit 110. As described above, the boost ripple emulator circuit 136 emulates current ripple during boost phases of buck-boost operations.

It will be appreciated that the LXIN and COMC signals are in phase with the current in the inductor, which is indicated as inductor current IL. In some embodiments, the LXIN and COMC signals may be in phase with the derivative of the inductor current IL. It will further be appreciated that other signals that are in phase with the inductor current, the derivative of the inductor current, etc., may alternatively be used.

The ripple based controller circuit 150 in FIG. 3 includes an RC network including two resistances 153 and 154 that voltage divide the output voltage VOUT from the buck-boost converter circuit 110 and also a capacitance 152. The divided output voltage is combined in the ripple based controller circuit 150 with the emulated inductor current from the ripple emulator circuit 130, and fed into a charge amplifier 156. The charge amplifier 156 includes an operational amplifier (op amp) 157 and a capacitance 158. The non-inverting terminal of the op amp 157 is coupled to a reference voltage VREF, and the inverting terminal of the op amp 157 is coupled to a node that combines the voltage divided output signal and the emulated current ripple from the ripple emulator circuit 130. The charge amplifier 156 generates an error voltage VERROR based on comparing the reference voltage VOUT with the combination of the emulated inductor current ripple and the voltage divided output voltage.

The output of the op amp 157 is coupled to the input terminal of a hysteretic comparator 160, which is configured to generate the hysteretic control signal based on the error voltage VERROR exceeding certain thresholds in a hysteretic manner.

The switch control circuit 170 in FIG. 3 includes a control logic block 172 that is configured to generate control signals for the switches 120, 122, 124, 126 of the buck-boost converter circuit 110 in response to the oscillating clock signal CLK and the hysteretic control signal TON_COMP.

Figure 4:
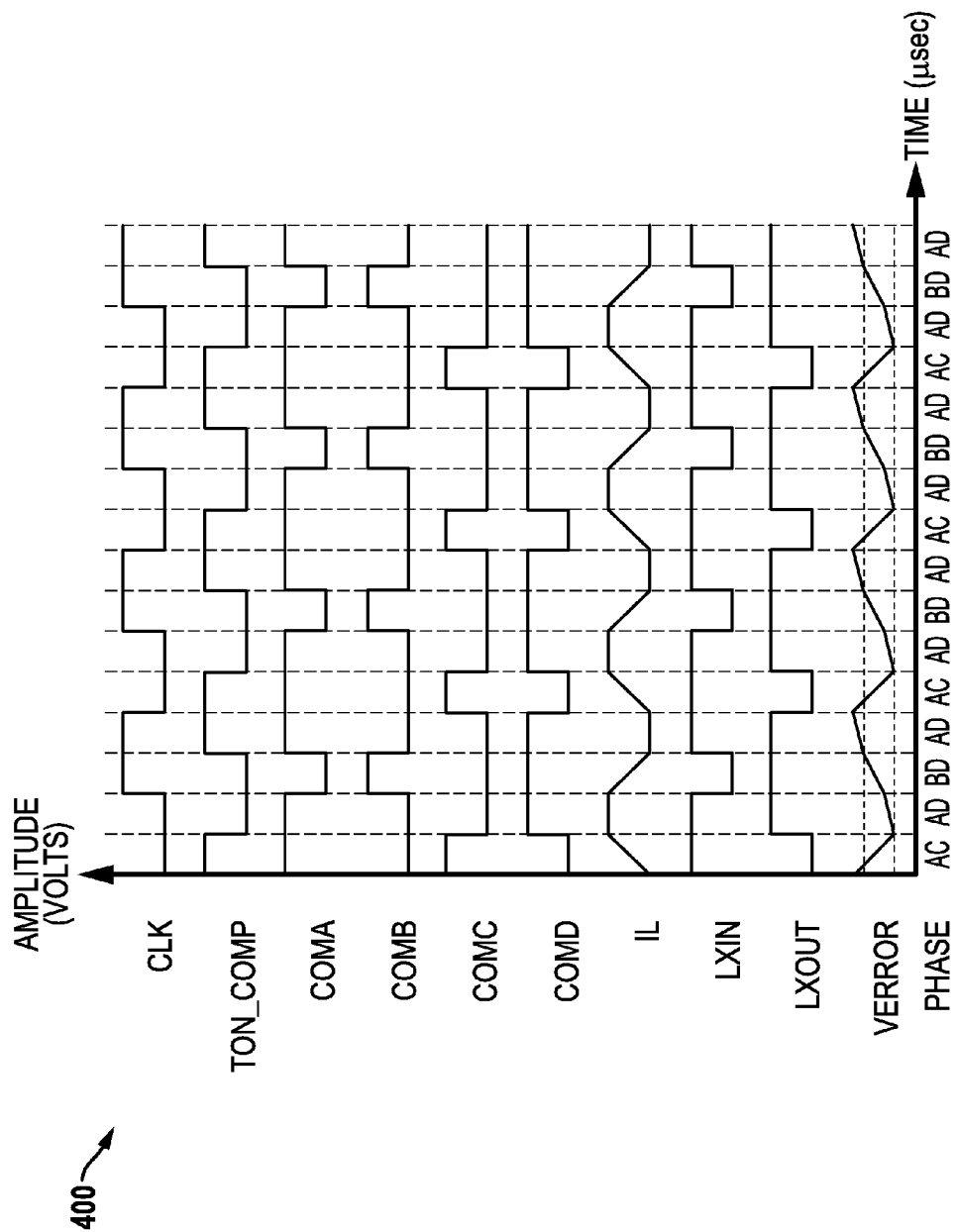
FIG. 4 is a timing diagram that illustrates the operation of the apparatus of FIG. 3.

FIG. 4 is a timing diagram 400 that illustrates the operation of apparatus 300 of FIG. 3. Timing diagram 400 illustrates a buck-boost cycle including a buck phase followed by a boost phase. With more granularity, FIG. 4 shows four phases: a buck TON phase labeled "AD", followed by a buck TOFF phase labeled "BD", followed by a boost TOFF phase labeled "AD", followed by a boost TON phase labeled "AC", followed by a pattern which then repeats as shown in FIG. 4. As explained above, the ripple emulator circuit 130 adds information about the inductor current IL (e.g., the LXIN and COMC signals) to the system during a buck-boost mode of operation for use in controlling the buck-boost converter circuit 110, as will be presently described in more detail.

In the buck TON phase, CLK is high and TON_COMP is high (resulting from LXIN being high, and COMC being low). In this phase, switches A and D are closed, while switches B and C are open.

In the buck TOFF phase, CLK is still high, but TON_COMP is low (resulting from LXIN being low, and COMC also being low). In this phase, switches B and D are closed, while switches A and C are open.

In boost TOFF phase, CLK is low and TON_COMP is also low (resulting from LXIN being high, and COMC being low). In this phase, switches A and D are closed, while switches B and C are open.

In the boost TON phase, CLK is still low, but TON_COMP is high (resulting from LXIN being high, and COMC also being high). In this phase, switches A and C are closed, while switches B and D are open.

In this manner, the buck-boost cycle modulation may be created by the apparatus 300 in FIG. 3 by superimposing a buck phase and a boost phase, as further illustrated in the inductor current IL shown in FIG. 4.

While the subject matter of the invention is described with specific preferred embodiments and example embodiments, the foregoing drawings and descriptions thereof depict only typical embodiments of the subject matter and are not therefore to be considered as limiting of its scope, and many alternatives and variations will be apparent to those skilled in the art. Inventive aspects of the present disclosure may lie in less than all features of a single foregoing disclosed embodiment. As just one example, while FIG. 3 illustrates one embodiment of a ripple based controller circuit, other types of ripple based controller circuits can be used, including a constant ON time or a simple comparator ripple based controller circuit.

Furthermore, some embodiments described herein include some but not other features included in other embodiments, and therefore combinations of features of different embodiments are meant to be within the scope of the disclosure, and form different embodiments, as would be understood by those skilled in the art.

What is claimed is:

1. An apparatus, comprising:
   a buck-boost converter circuit including a plurality of switches to be coupled to an inductor, the buck-boost converter circuit configured to generate a regulated output voltage responsive to an input voltage;
   a ripple emulator circuit configured to emulate inductor current ripple for a buck phase and a boost phase of the buck-boost converter circuit to provide an emulated inductor current ripple, wherein the ripple emulator circuit comprises a buck ripple emulator circuit comprising a first series RC circuit having an input for receiving a first signal in phase with current through the inductor and an output, and boost ripple emulator circuit comprising a second series RC circuit having an input for receiving a second signal in phase with the current through the inductor and an output coupled to the output of the buck ripple emulator circuit for providing the emulated inductor current ripple;
   a ripple based controller circuit configured to generate a hysteretic control signal responsive to the emulated inductor current ripple and the regulated output voltage; and
   a switch control circuit configured to generate control signals for driving the plurality of switches responsive to the hysteretic control signal and a clock signal.

2. The apparatus of claim 1, wherein the buck ripple emulator circuit and the boost ripple emulator circuit are configured to simultaneously operate regardless of whether the buck-boost converter circuit is in the buck phase or the boost phase.

3. The apparatus of claim 1, wherein the buck ripple emulator circuit is configured to emulate the inductor current ripple for the buck phase responsive to an input voltage of the inductor.

4. The apparatus of claim 1, wherein the boost emulator ripple circuit is configured to emulate the inductor current ripple for the boost phase responsive to a phase control signal of a low side boost phase switch of the plurality of switches.

5. The apparatus of claim 1, wherein each of the buck ripple emulator circuit and the boost ripple emulator circuit is driven by a corresponding signal in phase with a derivative of a current through the inductor.

6. The apparatus of claim 1, wherein the emulated inductor current ripple for the buck and boost phases is independent of parasitics related to an output capacitance of the buck-boost converter circuit.

7. The apparatus of claim 1, wherein the ripple based controller circuit is configured to generate the hysteretic control signal with a stable frequency.

8. The apparatus of claim 1, wherein the emulated inductor current ripple is in phase with current flowing in the inductor.

9. The apparatus of claim 1, wherein the ripple based controller circuit comprises:
   a charge amplifier configured to generate an error voltage based on comparing a reference voltage with a combination of the emulated inductor current ripple and the regulated output voltage; and
   a hysteretic comparator configured to generate the hysteretic control signal based on the error voltage.

10. The apparatus of claim 1, wherein the clock signal is asynchronous to the hysteretic control signal.

11. The apparatus of claim 10, wherein the buck-boost converter circuit is configured to operate in the buck phase responsive to the clock signal being high and to operate in the boost phase responsive to the clock signal being low.

12. The apparatus of claim 1, wherein the ripple based controller circuit is configured to control a duty cycle of the hysteretic control signal and a phase of the hysteretic control signal relative to the clock signal to maintain the regulated output voltage near a reference voltage for varying load current requirements.

13. The apparatus of claim 1, wherein the plurality of switches comprises high side and low side boost phase switches and high side and low side buck phase switches.

14. A DC-DC converter, comprising:
a buck-boost converter circuit having an inductor to generate a regulated output voltage responsive to an input voltage;
a ripple emulator circuit configured to emulate inductor current ripple for a buck phase and a boost phase of the buck-boost converter circuit to provide an emulated inductor current ripple, wherein the ripple emulator circuit comprises a buck ripple emulator circuit comprising a first series RC circuit having an input for receiving a first signal in phase with current through the inductor and an output, and boost ripple emulator circuit having an input for receiving a second signal in phase with the current through the inductor and an output coupled to the output of the buck ripple emulator circuit for providing the emulated inductor current ripple;
a ripple based controller circuit configured to generate a hysteretic control signal responsive to the emulated inductor current ripple and the regulated output voltage; and
a control logic circuit configured to generate control signals for driving the plurality of switches responsive to the hysteretic control signal and a clock signal for selectively driving the plurality of switches in the buck phase and in the boost phase.

15. The DC-DC converter of claim 14, wherein:
the buck ripple emulator circuit is responsive to an input voltage of an inductor of the buck-boost converter circuit; and
the boost ripple emulator circuit is responsive to a phase control signal of a low side boost phase switch of the plurality of switches.

16. The DC-DC converter of claim 15, wherein each of the buck ripple emulator circuit and the boost ripple emulator circuit is driven by a corresponding signal in phase with a derivative of a current through the inductor.

17. The DC-DC converter of claim 14, wherein the ripple based controller circuit comprises:
a charge amplifier configured to generate an error voltage based on comparing a reference voltage with a combination of the emulated inductor current ripple and the regulated output voltage; and
a hysteretic comparator configured to generate the hysteretic control signal based on the error voltage.

18. The DC-DC converter of claim 17, wherein the ripple based controller circuit combines the emulated inductor current ripple and the regulated output voltage by summing the emulated inductor current ripple with a divided regulated output voltage at an input of an operational amplifier.

19. A method comprising:
generating a regulated output voltage responsive to an input voltage using a buck-boost converter circuit having an inductor and a buck phase and a boost phase;
emulating inductor current ripple for the buck phase and the boost phase to provide an emulated inductor current ripple, wherein said emulating comprises:
emulating a buck ripple with a first series RC circuit having an input for receiving a first signal in phase with current through the inductor and an output, and
emulating a boost ripple with a second series RC circuit having an input for receiving a second signal in phase with the current through the inductor and an output coupled to the output of the first series RC circuit for providing the emulated inductor current ripple;
generating a hysteretic control signal responsive to the emulated inductor current ripple and the regulated output voltage; and
generating control signals responsive to the hysteretic control signal and a clock signal that selectively drive the buck-boost converter circuit for the buck phase and the boost phase.

20. The method of claim 19 further comprising:
simultaneously operating the first series RC circuit and the second series RC circuit regardless of whether the buck-boost converter circuit is in the buck phase or the boost phase.

* * * * *